US012747746B2

(12) United States Patent
Yue

(10) Patent No.: US 12,747,746 B2
(45) Date of Patent: Sep. 29, 2026

(54) BUCKLE, ROOF TENT, AND ROOF TRUNK

(71) Applicant: SHENZHEN YANGNING AUTO ACCESSORY CO., LTD, Shenzhen (CN)

(72) Inventor: Shiawdar Shaun Yue, Shenzhen (CN)

(73) Assignee: SHENZHEN YANGNING AUTO ACCESSORY CO., LTD, Shenzhen (CN)

( * ) Notice: Subject to any disclaimer, the term of this patent is extended or adjusted under 35 U.S.C. 154(b) by 213 days.

(21) Appl. No.: 18/648,403

(22) Filed: Apr. 28, 2024

(65) Prior Publication Data

US 2025/0314263 A1    Oct. 9, 2025

(30) Foreign Application Priority Data

Apr. 7, 2024 (CN) ......................... 202420724992.1

(51) Int. Cl.

| | |
|---|---|
| ***E05C 19/14*** | (2006.01) |
| ***B60R 9/055*** | (2006.01) |
| ***E04H 15/06*** | (2006.01) |
| ***E05B 13/08*** | (2006.01) |
| ***F16B 5/00*** | (2006.01) |

(52) U.S. Cl.

CPC ............ *F16B 5/0084* (2013.01); *B60R 9/055* (2013.01); *E04H 15/06* (2013.01)

(58) Field of Classification Search

CPC ........... Y10T 24/2183; Y10T 292/0917; F16G 15/04; A43C 11/148; A43C 11/1406; Y10S 292/49; B60R 9/055; E04H 15/06; E05C 19/12; E05C 19/14; E05B 13/002

USPC .......................................................... 292/246

See application file for complete search history.

(56) References Cited

U.S. PATENT DOCUMENTS 3,411,819 A * 11/1968 Tyree ........................ B60P 3/38 296/176
4,243,255 A * 1/1981 Hornak .................. E05C 19/14 292/210
5,002,002 A * 3/1991 Awalt, Jr. ................ B63B 21/22 114/210
5,271,649 A * 12/1993 Gromotka ............... E05C 19/14 292/DIG. 40
2010/0116858 A1* 5/2010 Foley ........................ B60R 9/08 224/317
2011/0068588 A1* 3/2011 Kopylov ................. E05C 19/14 292/200
2021/0293047 A1* 9/2021 Frederickson .......... B60P 3/341

* cited by examiner

*Primary Examiner* — Jack W Lavinder

(74) *Attorney, Agent, or Firm* — HOWARD M COHN and Associates, LLC

(57) ABSTRACT

A buckle, a roof tent, and a roof trunk are disclosed. The buckle includes a first fixing seat, a second fixing seat, a connecting arm, and a locking assembly. The first fixing seat includes a first fixing portion. The second fixing seat includes a catching portion and a second fixing portion. One end of the connecting arm is rotatably connected to the first fixing seat. The other end of the connecting arm includes a drawbar used to be engaged and secured with the catching portion. The connecting arm includes a first insertion hole. The first fixing seat includes a second insertion hole. The locking assembly is used to be inserted into the first insertion hole and the second insertion hole to fix the connecting arm and the first fixing seat together to prevent the connecting arm from rotating.

19 Claims, 9 Drawing Sheets

BUCKLE, ROOF TENT, AND ROOF TRUNK

CROSS-REFERENCE TO RELATED APPLICATIONS

This application claims the priority and benefit of Chinese patent application number CN202420724992.1, titled "BUCKLE" and filed Apr. 7, 2024 with China National Intellectual Property Administration, the entire contents of which are incorporated herein by reference.

TECHNICAL FIELD

This application relates to the technical field of locks, and more particularly relates to a buckle.

BACKGROUND

The description provided in this section is intended for the mere purpose of providing background information related to the present application but doesn't necessarily constitute prior art.

A buckle is a connecting member used to fasten two items together, and has a wide range of applications. A buckle is generally divided into two parts, including a male part and a female part. The male part and the female part are engaged with each other to realize locking of e.g. cabinet doors and splicing pieces. Existing buckles may have a complex structure in design resulting in relatively high costs, and are more complicated in the unlocking and locking stages.

SUMMARY

It is therefore one purpose of this application to provide a low-cost and easy-to-use buckle.

This application discloses a buckle. The buckle includes a first fixing seat, a second fixing seat, a connecting arm, and at least one locking assembly. The first fixing seat includes a first fixing portion. The second fixing seat and the first fixing seat are arranged side by side. The second fixing seat includes a catching portion and a second fixing portion. One end of the connecting arm is rotatably connected to the first fixing seat. The other end of the connecting arm includes a drawbar, which is used to be engaged and secured with the catching portion. The connecting arm includes at least one first insertion hole. The first fixing seat includes a second insertion hole corresponding to the at least one first insertion hole. The at least one locking assembly is used to insert into the first insertion hole and the second insertion hole to fix the connecting arm and the first fixing seat together to prevent the connecting arm from rotating.

In some embodiments, the at least one locking assembly includes a fastener and an elastic stretchable piece. The fastener is fixedly connected to the first fixing seat. The elastic stretchable piece is elastically connected to the fastener and is inserted into and fitted with the first insertion hole. When being pulled, the elastic stretchable piece contracts so as to be separated from the first insertion hole, and the connecting arm can be rotated so that the drawbar is separated from the catching portion, and at this time the buckle is in an unlocked state. The connecting arm can be rotated so that the drawbar is engaged and secured with the catching portion, and the elastic stretchable piece can be inserted into and engaged with the first insertion hole, and at this time the buckle is in a locked state.

In some embodiments, the second insertion hole is a circular threaded hole. The fastener has a shape of a circular tube, and an outer surface of the fastener is formed with threads. The fastener is threadedly connected to the second insertion hole. The elastic stretchable piece includes a bolt, a spring, and a pull piece. The bolt includes a first bolt segment and a second bolt segment that are connected and located on a same straight line. A cross-sectional area of the first bolt segment is greater than a cross-sectional area of the second bolt segment. The spring is sleeved on the second bolt segment. One end of the second bolt segment facing away from the first bolt segment is fixedly connected to the pull piece. An interior of the fastener is hollow to define a first through hole and a second through hole oriented on the same straight line. The first through hole is located between the second through hole and the first insertion hole. A cross-sectional area of the first through hole is greater than a cross-sectional area of the second through hole and a cross-sectional area of the first bolt segment. A cross-sectional area of the second through hole is smaller than a cross-sectional area of the first bolt segment and greater than a cross-sectional area of the second bolt segment. The second bolt segment is fitted with the second through hole. The first bolt segment is fitted with the first through hole.

In some embodiments, the locking assembly further includes a nut that sleeved on the fastener and threadedly connected to the fastener.

In some embodiments, one end of the second bolt segment facing away from the first bolt segment has a connecting hole. The pull piece is ring-shaped and passes through the connecting hole to be connected to the bolt.

In some embodiments, the connecting arm includes a slide groove. Along a length direction of the slide groove, a first end of the slide groove is connected to the first insertion hole, and a second end of the slide groove penetrates through the connecting arm. A depth of the slide groove gradually increases in a direction from the first end of the slide groove to the second end of the slide groove. The length direction of the slide groove is a tangential direction of a rotation path of the connecting arm around the fixing seat. The depth direction of the slide groove is perpendicular to the length direction of the slide groove.

In some embodiments, the connecting arm includes a fixing arm and a movable arm. One end of the fixing arm is rotatably connected to the first fixing seat. One end of the movable arm is rotatably connected to the fixing arm. The drawbar is disposed at one end of the movable arm facing away from the fixing arm. The fixing arm can rotate in a direction away from or towards the first fixing seat. The movable arm can rotate in a direction away from or towards the first fixing seat.

In some embodiments, the fixing arm includes a first plate and a second plate arranged opposite to each other, and further includes a handle and a crossbar connecting the first plate and the second plate together. The handle connects an end of the first plate with an end of the second plate. The cross beam connects a middle portion of the first plate with a middle portion of the second plate. The first insertion hole is defined in the first plate and/or the second plate. The first plate and the second plate each include a first shaft hole. The first shaft holes are located at an end of the first plate and the second plate facing away from the handle. The fixing arm is rotatably connected to the first fixing seat through a first rotary shaft. The first rotary shaft passes through the first shaft holes in the first plate and the second plate to be connected to the first fixing seat.

In some embodiments, the movable arm includes a second shaft hole. The movable arm is rotatably connected to the fixing arm through a second rotary shaft. The second rotary shaft passes through the second shaft hole to be connected to the first plate and the second plate.

In some embodiments, the second rotary shaft is located between the cross beam and the first rotary shaft. The second rotary shaft is arranged parallel to the first rotary shaft.

In some embodiments, a bearing is disposed in each of the first shaft hole and the second shaft hole.

In some embodiments, the end of the movable arm facing away from the fixing arm defines an opening. A connecting rod oriented parallel to the first rotary shaft is disposed at an opening end of the opening, and the connecting rod constitutes the drawbar. The second fixing seat includes a first bottom plate and a protrusion. The protrusion and the second fixing portion are both disposed on the first bottom plate. The side of the protrusion facing away from the first fixing seat defines a catching notch. When the buckle is in the locked state, the drawbar is engaged and interlocked with the catching notch, where the protrusion and the catching notch jointly constitute the catching portion.

In some embodiments, the second fixing portion includes two racetrack-shaped through slots. The two through slots are respectively located on both sides of the protrusion.

In some embodiments, the first fixing seat includes a first side plate, a second side plate, a second bottom plate, and a stage. The first side plate, the second side plate, and the stage are all arranged on a same side of the second bottom plate. The first side plate and the second side plate are arranged oppositely. Both ends of the stage are respectively connected to one end of the first side plate and one end of the second side plate. A height of the stage is lower than a height of each of the first side plate and the second side plate. The first fixing portion is arranged on the second bottom plate. Both ends of the first rotary shaft are connected to the first side plate and the second side plate respectively. When the buckle is in the locked state, the fixing arm abuts on the stage.

In some embodiments, the second insertion hole is defined in each of the first side plate and the second side plate.

In some embodiments, the buckle includes two locking assemblies. One of the locking assemblies is fitted with the first insertion hole in the first plate and the second insertion hole in the first side plate. Another locking assembly is fitted with the first insertion hole in the second plate and the second insertion hole in the second side plate.

In some embodiments, the first fixing portion includes two racetrack-shaped through slots. The two through slots are located side by side in a central area of the second bottom plate.

In some embodiments, a screw hole is defined in each of four corners of the second bottom plate.

In some embodiments, the fixing arm includes a first plate and a second plate arranged opposite to each other, and further includes a handle and a crossbar connecting the first plate and the second plate together. The handle connects an end of the first plate with an end of the second plate. The cross beam connects a middle portion of the first plate with a middle portion the second plate. The first insertion hole is defined in the first plate or the second plate. The first plate and the second plate each include a first shaft hole. The first shaft hole is located at an end of each of the first plate and the second plate facing away from the handle. The fixing arm is rotatably connected to the first fixing seat through a first rotary shaft. The first rotary shaft passes through the first shaft holes in the first plate and the second plate to be connected to the first fixing seat. The first fixing seat includes a first side plate, a second side plate, a second bottom plate, and a stage. The first side plate, the second side plate, and the stage are all arranged on a same side of the second bottom plate. The first side plate and the second side plate are arranged oppositely. Both ends of the stage are respectively connected to one end of the first side plate and one end of the second side plate. A height of the stage is lower than a height of each of the first side plate and the second side plate. The first fixing portion is disposed on the second bottom plate. When the buckle is in the locked state, the fixing arm abuts on the stage. The second insertion hole is defined in the first side plate or the second side plate. Both ends of the first rotary shaft are connected to the first side plate and the second side plate respectively. The buckle includes one locking assembly, which is fitted with the first insertion hole and the second insertion hole.

In some embodiments, the first insertion hole is a through hole.

In some embodiments, the first insertion hole is a blind hole, and an opening of the first insertion hole faces the corresponding second insertion hole.

This application further discloses a roof tent. The roof tent includes a first board, a second board, and at least one buckle. One end of the first board is rotatably connected to one end of the second board. The buckle includes a first fixing seat, a second fixing seat, a connecting arm, and at least one locking assembly. The first fixing seat includes a first fixing portion. The first fixing seat is fixed to the first plate through the first fixing portion. The second fixing seat and the first fixing seat are arranged side by side. The second fixing seat includes a catching portion and a second fixing portion. The second fixing seat is fixed to the second plate through the second fixing portion. One end of the connecting arm is rotatably connected to the first fixing seat. The other end of the connecting arm includes a drawbar, which is used to be engaged and secured with the catching portion. The connecting arm includes at least one first insertion hole. The first fixing seat includes a second insertion hole corresponding to each of the at least one first insertion hole. The locking assembly is used to be inserted into the first insertion hole and the second insertion hole to fix the connecting arm and the first fixing seat together to prevent the connecting arm from rotating.

This application further discloses a roof trunk. The roof tent includes a first trunk part, a second trunk part, and at least one buckle. One end of the first trunk part is rotatably connected to one end of the second trunk part. The buckle includes a first fixing seat, a second fixing seat, a connecting arm, and at least one locking assembly. The first fixing seat includes a first fixing portion. The first fixing seat is fixed to the first trunk part through the first fixing portion. The second fixing seat and the first fixing seat are arranged side by side. The second fixing seat includes a catching portion and a second fixing portion. The second fixing seat is fixed to the second trunk part through the second fixing portion. One end of the connecting arm is rotatably connected to the first fixing seat. The other end of the connecting arm includes a drawbar, which is used to be engaged and secured with the catching portion. The connecting arm includes at least one first insertion hole. The first fixing seat includes a second insertion hole corresponding to the at least one first insertion hole. The locking assembly is used to be inserted into the first insertion hole and the second insertion hole to fix the connecting arm and the first fixing seat together to prevent the connecting arm from rotating.

This application provides the following beneficial effects. By securing the first fixing seat and the second fixing seat to two pieces respectively, and using the drawbar in the connecting arm to be engaged with the catching portion in the second fixing seat, the two pieces are secured together. Furthermore, the buckle in this application further includes a locking assembly, which is inserted into the first insertion hole in the connecting arm and the second insertion hole in the first fixing seat to fix up the connecting arm and the first fixing seat together thus preventing the connecting arm from rotating. The locking assembly is easy to lock and unlock with a desirable locking effect, so that it is very simple and convenient to use. In addition, the entire buckle has a simple structure and is easy to manufacture, which is conducive to reducing costs.

BRIEF DESCRIPTION OF DRAWINGS

The accompanying drawings are used to facilitate a further understanding of the embodiments according to this application, and constitute a part of the specification. They are used to illustrate the embodiments according to this application, and explain the principles of this application in conjunction with the text description. Apparently, the drawings in the following description merely represent some embodiments of this application, and for those having ordinary skill in the art, other drawings may also be obtained based on these drawings without investing creative efforts. A brief description of the accompanying drawings is provided as follows.

Figure 1:
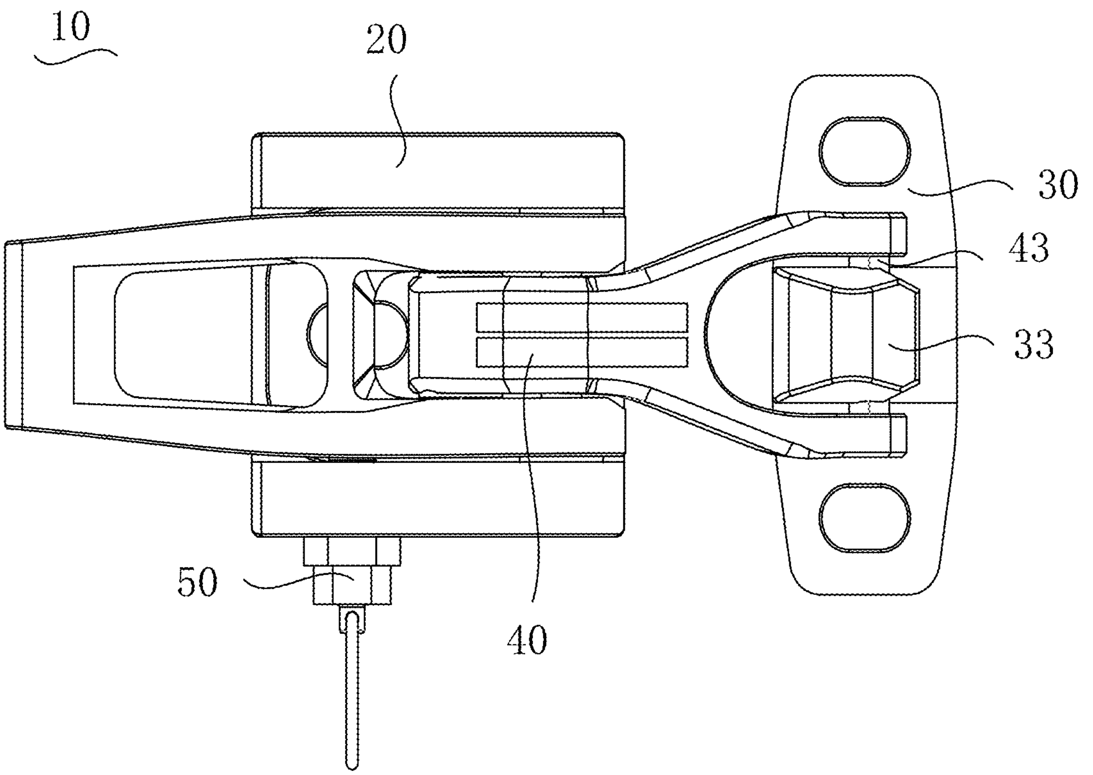
FIG. 1 is a schematic plan view of a buckle according to an embodiment of this application in a locked state.

In the drawing: 1. Roof tent; 1*a*. First plate; 1*b*. Second plate; 2. Roof trunk; 2*a*. First trunk part; 2*b*. Second trunk part; 10. Buckle; 20. First fixing seat; 21. First side plate; 22. Second side plate; 23. Second bottom plate; 231. First fixing portion; 232. Screw hole; 24. Stage; 25. Second insertion hole; 30. Second fixing seat; 31. First bottom plate; 311. Second fixing portion; 32. Protrusion; 321. Catching notch; 33. Catching portion; 40. Connecting arm; 41. Fixing arm; 411. First plate; 412. Second plate; 413. Handle; 414. Cross beam; 415. First shaft hole; 42. Movable arm; 421. Second shaft hole; 422. Opening; 423. Connecting rod; 43. Draw-bar; 44. First insertion hole; 45. Slide groove; 50. Locking assembly; 51. Elastic stretchable piece; 510. Bolt; 511. First bolt segment; 512. Second bolt segment; 513. Connecting hole; 514. Spring; 515. Pull piece; 52. Fastener; 521. First through hole; 522. Second through hole; 53. Nut; 60. First rotary shaft; 70. Second rotary shaft; 80. Padlock; 81. Lock body; 82. Lock hook; 83. Lock cylinder.

DETAILED DESCRIPTION OF EMBODIMENTS

It should be understood that the terms used herein, the specific structures and function details disclosed herein are intended for the mere purposes of describing specific embodiments and are representative. However, this application may be implemented in many alternative forms and should not be construed as being limited to the embodiments set forth herein.

As used herein, terms “first”, “second”, or the like are merely used for illustrative purposes, and shall not be construed as indicating relative importance or implicitly indicating the number of technical features specified. Thus, unless otherwise specified, the features defined by “first” and “second” may explicitly or implicitly include one or more of such features. Terms “multiple”, “a plurality of”, and the like mean two or more. Term “comprising”, “including”, and any variants thereof mean non-exclusive inclusion, so that one or more other features, integers, steps, operations, units, components, and/or combinations thereof may be present or added.

In addition, terms “center”, “transverse”, “up”, “down”, “left”, “right”, “vertical”, “horizontal”, “top”, “bottom”, “inside”, “outside”, or the like are used to indicate orientational or relative position al relationships based on those illustrated in the drawings. They are merely intended for simplifying the description of the present disclosure, rather than indicating or implying that the device or element referred to must have a particular orientation or be constructed and operate in a particular orientation. Therefore, these terms are not to be construed as restricting the present disclosure.

Furthermore, as used herein, terms “installed on”, “mounted on”, “connected to”, “coupled to”, “connected with”, and “coupled with” should be understood in a broad sense unless otherwise specified and defined. For example, they may indicate a fixed connection, a detachable connection, or an integral connection. They may denote a mechanical connection, or an electrical connection. They may denote a direct connection, a connection through an intermediate, or an internal connection between two elements. For those of ordinary skill in the art, the specific meanings of the above terms as used in the present application can be understood depending on specific contexts.

Hereinafter this application will be described in further detail with reference to the accompanying drawings and some optional embodiments.

Figure 2:
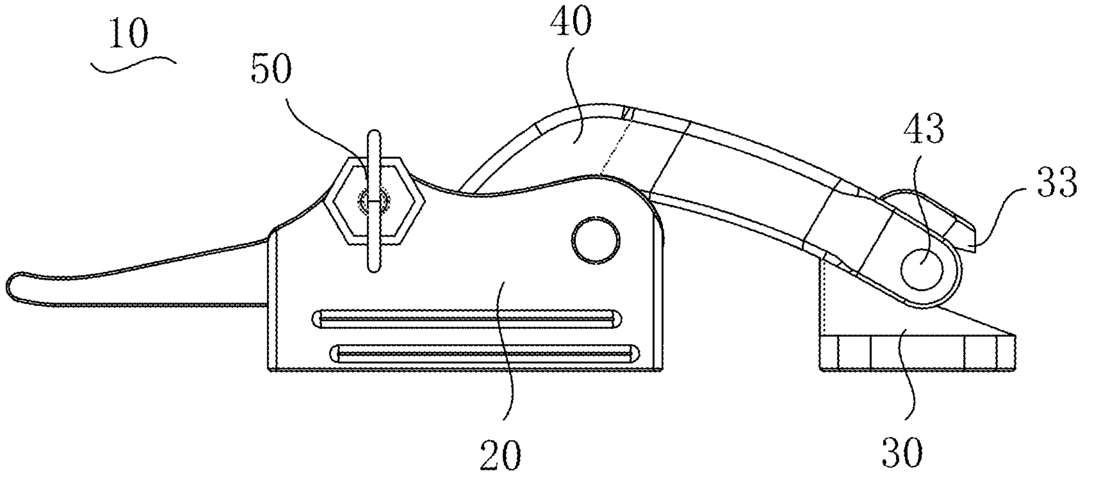
FIG. 2 is a schematic side view of a buckle according to an embodiment of this application in a locked state.

FIG. 1 is a schematic plan view of a buckle according to an embodiment of this application in a locked state. FIG. 2 is a schematic side view of a buckle according to an embodiment of this application in a locked state. As illustrated in FIGS. 1 and 2, as a buckle 10 according to an embodiment of the present application, the buckle 10 includes a first fixing seat 20, a second fixing seat 30, a connecting arm 40, and a locking assembly 50. The second fixing seat 30 and the first fixing seat 20 are arranged side by side, and the first fixing seat 20 and the second fixing seat 30 are respectively fixed to two pieces that need to be connected together. One end of the connecting arm 40 is rotatably connected to the first fixing seat 20. The other end of the connecting arm 40 includes a drawbar 43, which is used to be engaged and secured with the catching portion 33 in the second fixing seat 30. The locking assembly 50 is fixed to the first fixing seat 20 and is used to lock the connecting arm 40 to prevent the connecting arm 40 from rotating.

Figure 3:
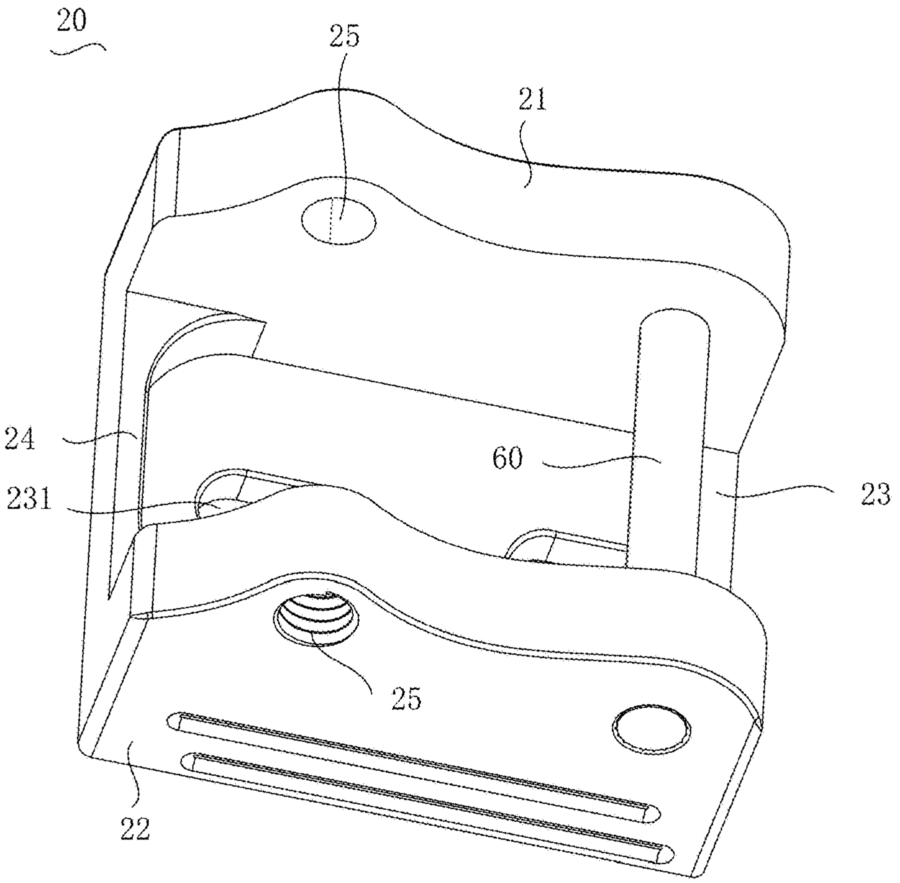
FIG. 3 is a schematic three-dimensional view of a first fixing seat according to an embodiment of this application.

FIG. 3 is a schematic three-dimensional view of a first fixing seat. As illustrated in FIG. 3, the first fixing seat 20 includes a first side plate 21, a second side plate 22, a second bottom plate 23, and a stage 24 that are integrally formed. The first side plate 21, the second side plate 22, and the stage 24 are all arranged on a same side of the second bottom plate 23. The first side plate 21 and the second side plate 22 are arranged opposite to each other. Two ends of the stage 24 are connected to one end of the first side plate 21 and one end of the second side plate 22, respectively. The first side plate 21, the second side plate 22, and the stage 24 are respectively located on three side edges of the bottom plate. A height of the stage 24 is lower than a height of each of the first side plate 21 and the second side plate 22.

Both the first side plate 21 and the second side plate 22 each have a second insertion hole 25 that is used to be fitted with the locking assembly 50, where the second insertion hole 25 is a through hole. Of course, there may be only one second insertion hole 25, which may be defined only in the first side plate 21 or only in the second side plate 22.

The second bottom plate 23 further includes a first fixing portion 231. The first fixing portion 231 may be a screw hole, a through slot, or other fixing structure. It is connected to an item through screw connection, welding, etc., to connect the first fixing seat 20 to this item.

Figure 4:
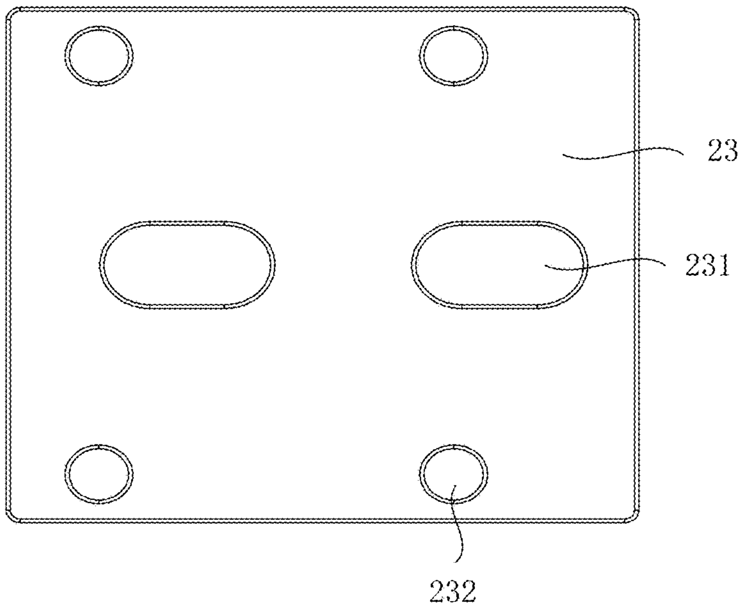
FIG. 4 is a schematic rear view of a first fixing seat according to an embodiment of this application.

FIG. 4 is a schematic rear view of a first fixing seat. As illustrated in FIG. 4, as a specific implementation, a first fixing portion 231 is further disposed on the second bottom plate 23. The first fixing portion 231 includes two racetrack-shaped through slots. The two through slots are arranged side by side in a central area of the second bottom plate 23. A screw hole 232 is further provided at each of four corners of the second bottom plate 23. The screw holes 232 extend into the first side plate 21 or the second side plate 22, and an opening of each screw hole 232 is located at the lowest bottom of the second bottom plate 23. Of course, in other implementations, the first fixing portion 231 may also include only one through slot or more than three through slots. Alternatively, no screw holes 232 may be provided in the second bottom plate 23, and the selection may be made depending on the actual situation.

Figure 5:
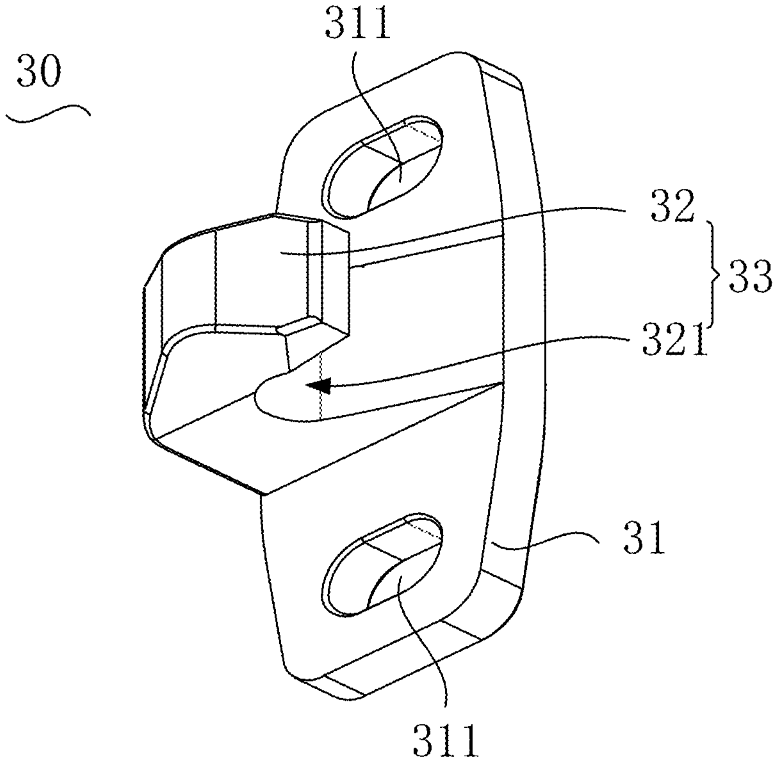
FIG. 5 is a schematic three-dimensional view of a second fixing seat according to an embodiment of this application.

FIG. 5 is a schematic three-dimensional view of a second fixing seat. As illustrated in FIG. 5, the second fixing seat 30 includes a catching portion 33 and a second fixing portion 311. In particular, the second fixing seat 30 includes a first bottom plate 31 and a protrusion 32. The protrusion 32 and the first fixing portion 231 are both arranged on the first bottom plate 31. The protrusion 32 has a catching notch 321 on the side facing away from the first fixing seat 20. When the buckle 10 is in the locked state, the drawbar 43 of the connecting arm 40 is engaged with the catching notch 321, and the protrusion 32 and the catching notch 321 jointly constitute the catching portion 33.

As a specific implementation, the protrusion 32 is located in a middle area of the first bottom plate 31, and the second fixing portion 311 includes two racetrack-shaped through slots, where the two through slots are located on both sides of the protrusion 32, respectively. Of course, in other embodiments, the first fixing portion 231 may further include only one through slot or more than three through slots. Alternatively, the first fixing portion 231 may also be a screw hole 232 or connection structures in other forms, which is not limited here. Furthermore, in other implementations, the catching portion 33 may not protrude from the first bottom plate 31, but a catching notch may be defined in the first bottom plate 31 to form the catching portion 33. Alternatively, the catching portion 33 may also be made into other forms, which may be selected depending on the actual situation.

Figure 6:
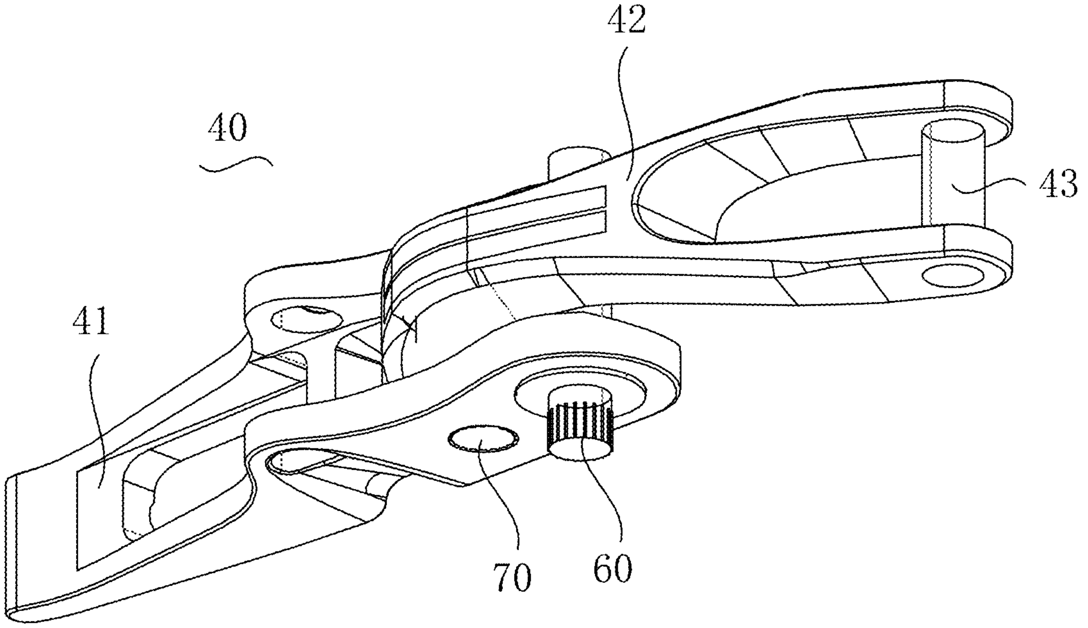
FIG. 6 is a schematic diagram of a connecting arm according to an embodiment of this application.

FIG. 6 is a schematic diagram of a connecting arm. As illustrated in FIG. 6, the connecting arm 40 includes two parts, including a fixing arm 41 and a movable arm 42. One end of the fixing arm 41 is rotatably connected to the first fixing seat 20. One end of the movable arm 42 is rotatably connected to the fixing arm 41. The drawbar 43 is disposed at an end of the movable arm 42 facing away from the fixing arm 41.

Figure 7:
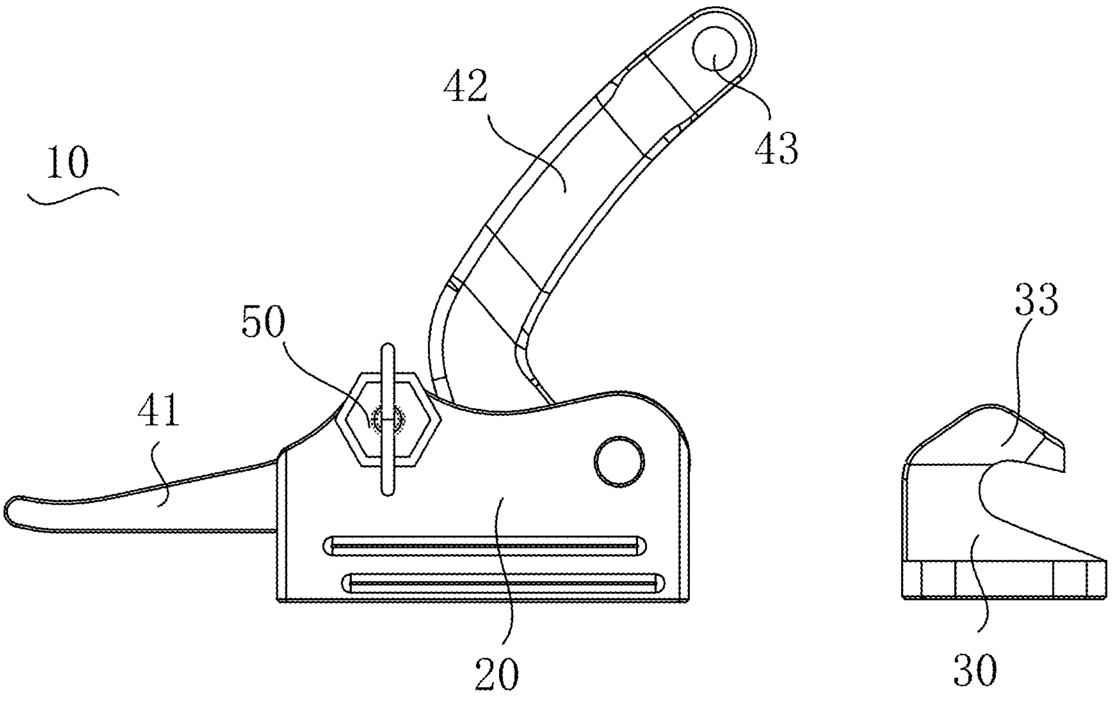
FIG. 7 is a schematic diagram of a buckle in a first unlocked state.
Figure 8:
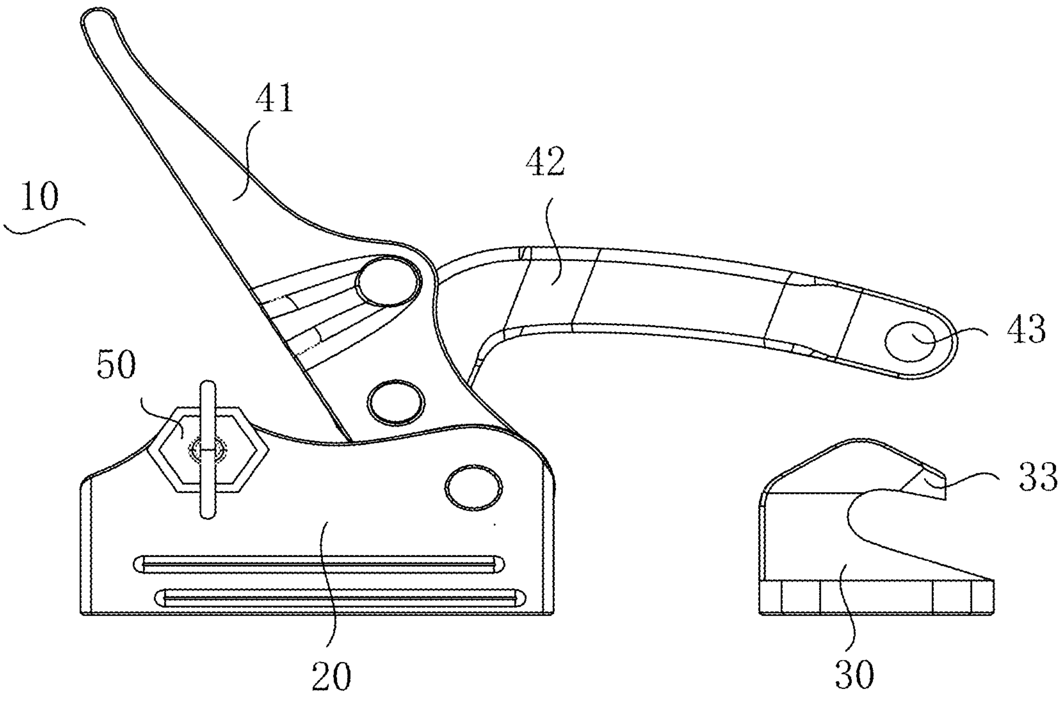
FIG. 8 is a schematic diagram of a buckle in a second unlocked state.

FIG. 2 is a schematic diagram of the buckle when it is in the locked state. FIG. 7 is a schematic diagram of the buckle in a first unlocked state. FIG. 8 is a schematic diagram of the buckle in a second unlocked state. As illustrated in FIGS. 2, 6, 7 and 8, both the fixing arm 41 and the movable arm 42 can rotate in a direction of getting farther away from or approaching the first fixing seat 20. By such a design, the range of movement of the drawbar 43 may be increased, and the applicable range of the buckle 10 may be increased without increasing the overall volume of the buckle 10.

Figure 9:
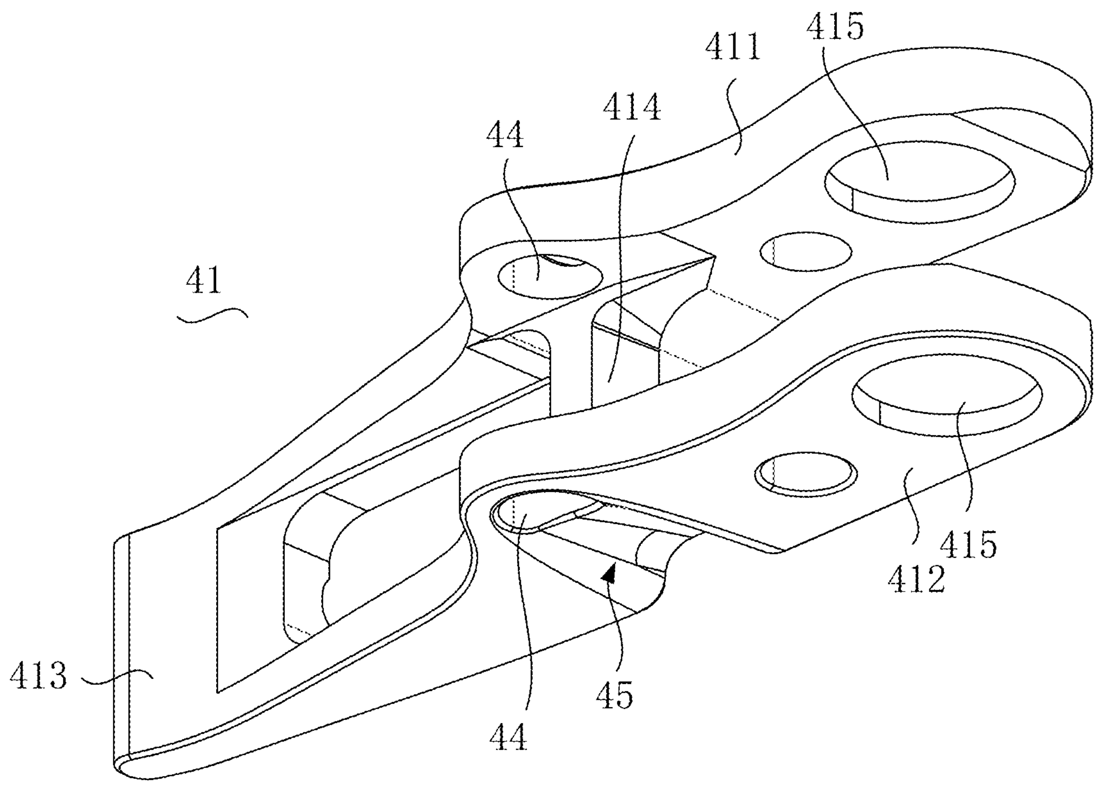
FIG. 9 is a schematic diagram of a fixing arm according to an embodiment of this application.

FIG. 9 is a schematic diagram of a fixing arm. As illustrated in FIG. 9, the fixing arm 41 includes a first plate 411 and a second plate 412 that are oppositely arranged, and further includes a handle 413 and a cross beam 414 connecting the first plate 411 and the second plate 412. The handle 413 connects the ends of the first plate 411 and the second plate 412, and the cross beam 414 connects the middle portions of the first plate 411 and the second plate 412. The fixing arm 41 is of an integrated structure. Along the direction of getting facing away from the handle 413, the width of each of the first plate 411 and the second plate 412 gradually decreases to ensure the connection strength between the fixing arm 41 and the first fixing seat 20. Furthermore, the handle 413 and the cross beam 414 jointly form a pressing region, which is convenient for the user to insert the thumb thereby improving the convenience of rotating the fixing arm 41.

Furthermore, the first plate 411 and the second plate 412 each include a first insertion hole 44. The first insertion hole 44 is a through hole. The first insertion hole 44 in the first plate 411 corresponds to the second insertion hole 25 in the first side plate 21, and their central axes coincide with each other. The first insertion hole 44 in the second plate 412 corresponds to the second insertion hole 25 in the second side plate 22, and their central axes coincide with each other.

Of course, in other implementations, there may be only one first insertion hole 44 and only one second insertion hole 25, where the first insertion hole 44 is only defined in the first plate 411, and the second insertion hole 25 is only defined in the first side plate 21. Alternatively, the first insertion hole 44 may be defined only in the second plate 412, and the second insertion hole 25 may be defined only in the second side plate 22.

In other implementations, the first insertion hole 44 may also be a blind hole, with the opening of the blind hole facing toward the outside; that is, the opening faces the corresponding second insertion hole 25.

In addition, the first plate 411 and the second plate 412 each include a first shaft hole 415. Each first shaft hole 415 is located at an end of the respective first plate 411 or second plate 412 facing away from the handle 413. The fixing arm 41 is rotatably connected to the first fixing seat 20 through a first rotary shaft 60. The first rotary shaft 60 passes through the first shaft holes 415 in the first plate 411 and the second plate 412 to be connected to the first fixing seat 20.

Furthermore, there may be disposed a bearing in the first shaft hole 415, and the first rotary shaft 60 is fitted with the rotary shaftfirst shaft hole 415 to enable the fixing arm 41 to rotate more smoothly.

Figure 10:
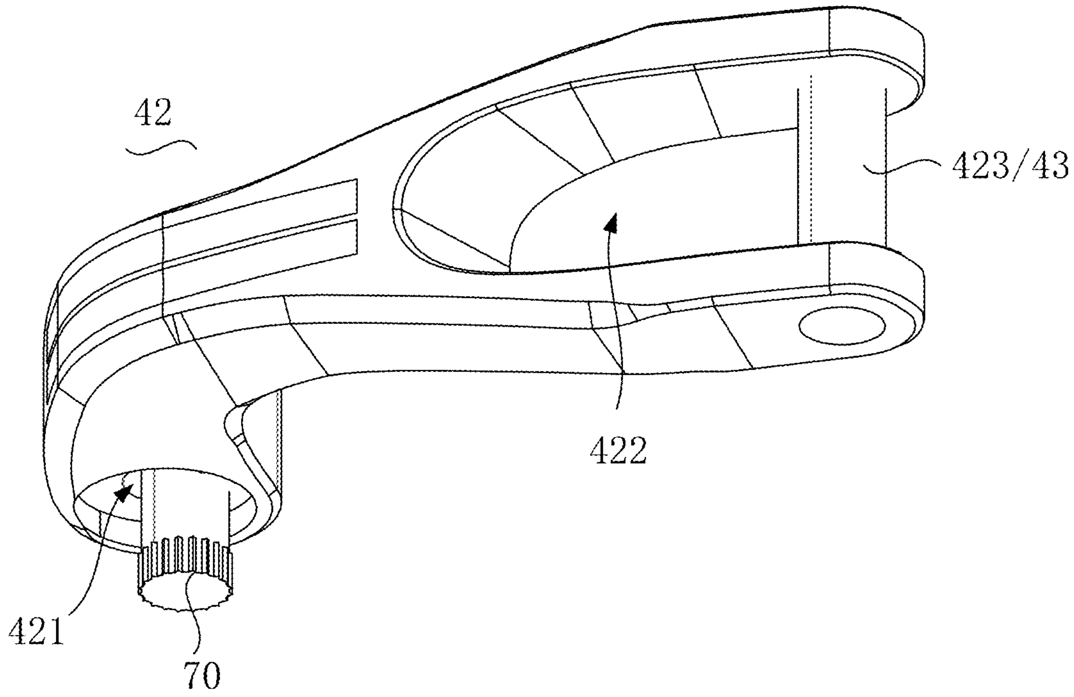
FIG. 10 is a schematic diagram of a movable arm according to an embodiment of this application.

FIG. 10 is a schematic diagram of a movable arm. As illustrated in FIG. 10, the movable arm 42 has an L-shaped structure. The movable arm 42 includes a second shaft hole 421. The movable arm 42 is rotatably connected to the fixing arm 41 through a second rotary shaft 70. The second rotary shaft 70 passes through the second shaft hole 421 and is connected to the first plate 411 and the second plate 412. When the movable arm 42 and the fixing arm 41 are fitted together, the second rotary shaft 70 is located between the cross beam 414 and the first rotary shaft 60. The second rotary shaft 70 is oriented parallel to the first rotary shaft 60.

Furthermore, a bearing is disposed in the second shaft hole 421, and the bearing operates in cooperation with the second rotary shaft 70 to enable the movable arm 42 to rotate more smoothly.

In an embodiment of the present application, an opening 422 is defined in an end of the movable arm 42 facing away from the fixing arm 41. The opening 422 is U-shaped. At an opening end of the opening 422 there is disposed a connecting rod 423 oriented parallel to the first rotary shaft 60. The connecting rod 423 constitutes the drawbar 43.

Figure 11:
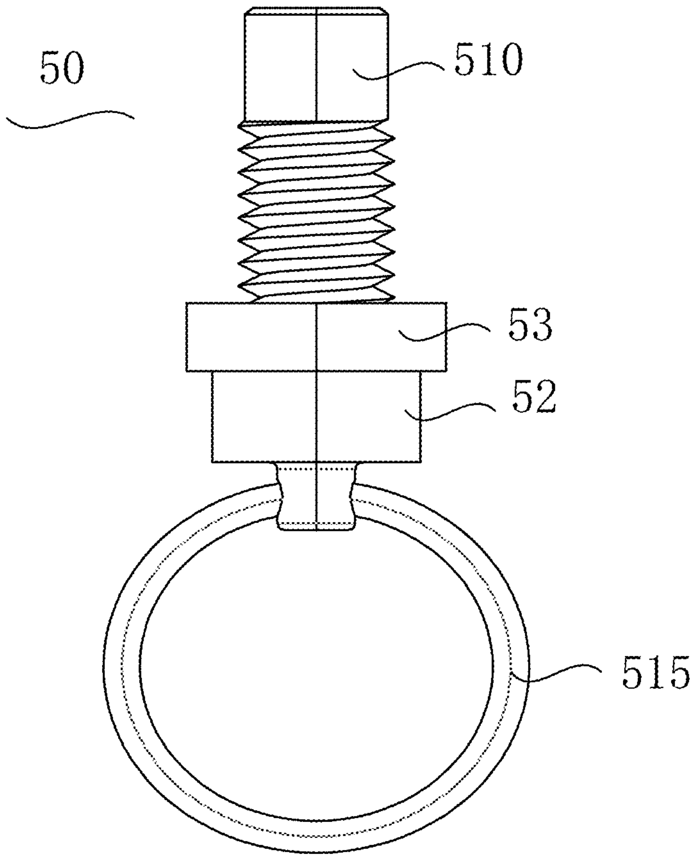
FIG. 11 is an overall schematic diagram of a locking assembly according to an embodiment of this application.
Figure 12:
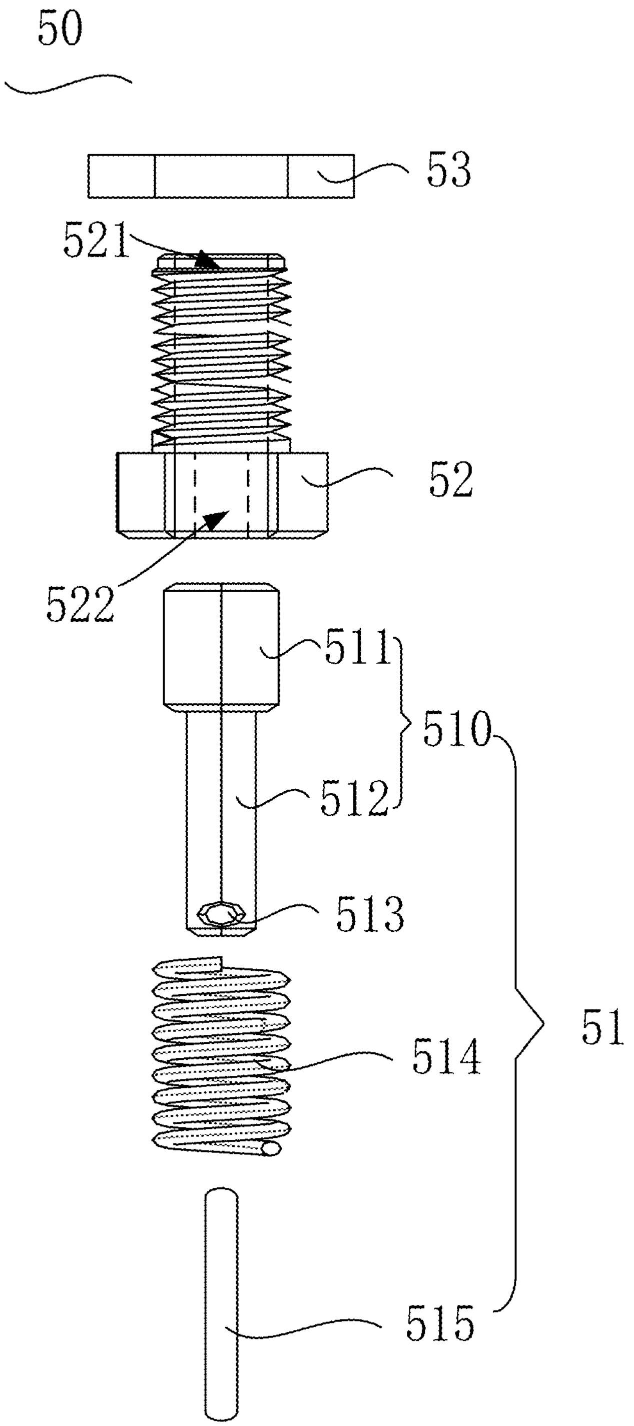
FIG. 12 is an exploded schematic diagram of a locking assembly according to an embodiment of this application.

FIG. 11 is an overall schematic diagram of the locking assembly. FIG. 12 is an exploded diagram of the locking assembly. As illustrated in FIGS. 11 and 12, the locking assembly 50 includes a fastener 52 and an elastic stretchable piece 51. The fastener 52 is fixedly connected to the first fixing seat 20. The elastic stretchable piece 51 is elastically connected to the fastener 52, and the elastic stretchable piece 51 is correspondingly inserted into and fitted with the first insertion hole 44. When being is pulled, the elastic stretchable piece 51 is separated from the first insertion hole 44. By rotating the connecting arm 40, the drawbar 43 can be separated from the catching portion 33 so that the buckle 10 enters an unlocked state. The connecting arm 40 may also be rotated so that the drawbar 43 is engaged with the catching portion 33 and then the elastic stretchable piece 51 is inserted into the first insertion hole 44, so that the buckle 10 enters a locked state.

In particular, the second insertion hole 25 is a circular threaded hole. The fastener 52 is in the shape of a circular tube, and an outer surface of the fastener 52 is formed with threads. The fastener 52 is threadedly fitted with the second insertion hole 25.

The elastic stretchable piece 51 includes a bolt 510, a spring 514, and a pull piece 515. The bolt 510 includes a first bolt segment 511 and a second bolt segment 512 that are connected and located on a same straight line. The cross-sectional area of the first bolt segment 511 is larger than the cross-sectional area of the second bolt segment 512. The spring 514 is sleeved on the second bolt segment 512. The end of the second bolt segment 512 facing away from the first bolt segment 511 defines a connecting hole 513. The pull piece 515 is fixedly connected to the connecting hole 513.

The fastener 52 is hollow inside to define a first through hole 521 and a second through hole 522 that are located on a same straight line. The first through hole 521 is located between the second through hole 522 and the first insertion hole 44. The cross-sectional area of the first through hole 521 is larger than the cross-sectional area of the second through hole 522 and the cross-sectional area of the first bolt segment 511. The cross-sectional area of the second through hole 522 is smaller than the cross-sectional area of the first bolt segment 511 and larger than the cross-sectional area of the second bolt segment 512. The second bolt segment 512 is fitted with the second through hole 522, and the first bolt segment 511 is fitted with the first through hole 521.

As illustrated in FIG. 9 and FIG. 12, in one embodiment of the present application, the first plate 411 and the second plate 412 each further define a slide groove 45. Along a length direction of the slide groove 45, a first end of the slide groove 45 is connected with the respective first insertion hole 44, and a second end of the slide groove 45 penetrates through the connecting arm 40. Furthermore, in the direction from the first end of the slide groove 45 to the second end of the slide groove 45, the depth of the slide groove 45 gradually increases, and the width of the slide groove 45 also gradually increases. The length direction of the slide groove 45 is a tangential direction of a rotation path of the connecting arm 40 around the fixing seat (it may also be understood as a thickness direction of the fixing arm 41). The depth direction of the slide groove 45 is perpendicular to the length direction of the slide groove 45 and is also perpendicular to the first plate 411 and the second plate 412. By arranging the slide groove 45 below the first insertion hole 44, when the buckle enters the locked state, there is no need to pull the pull piece 515, but only need to press the fixing arm 41. At this time, the side wall of the slide groove 45 is pressed against the moving bolt 510. As the fixing arm 41 gradually descends, the slide groove 45 also moves downward, gradually increasing the squeezing force acted on the bolt 510, and finally inserting the bolt 510 into the first insertion hole 44. This process does not require contact with the locking assembly 50, and there is no need to keep holding the pull piece 515 by hand, which is convenient to use.

Figure 13:
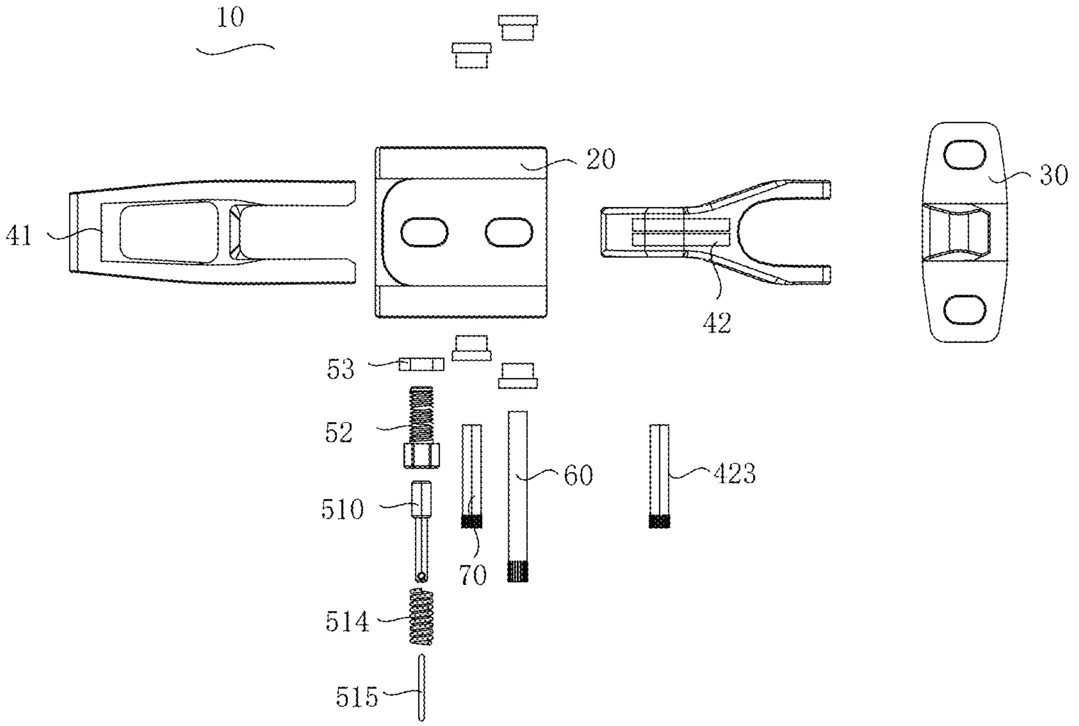
FIG. 13 is an exploded schematic diagram of a buckle according to an embodiment of this application.

FIG. 13 is an exploded diagram of the buckle. As illustrated in FIGS. 1 and 13, when the pull piece 515 is pulled outward, the pull piece 515 drives the bolt 510 to move outward and compress the spring 514 until the first bolt segment 511 abuts against the inner wall of the second through hole 522. At this time, the contracted bolt 510 is sufficient to pull the first bolt segment 511 out of the first insertion hole 44. At this time, the rotation of the fixing arm 41 is not restricted by the locking assembly 50. The fixing arm 41 may be first lifted up, and then the movable arm 42 may be rotated to disengage the drawbar 43 from the catching portion 33. At this time, the buckle 10 enters the unlocked state. When it is needed to lock up the buckle 10, one may first rotate the movable arm 42 to engage the drawbar 43 with the catching portion 30, and then press the fixing arm 41 so that the fixing arm 41 abuts on the stage 24. At this time, the first insertion hole 44 in the fixing arm 41 is just aligned with the second insertion hole 25 in the first fixing seat 20. The bolt 510 will be automatically inserted into the first insertion hole 44 under the action of the spring 514 to realize locking of the fixing arm 41, so that the buckle 10 enters the locked state.

In an embodiment of this application, the pull piece 515 may be circular, similar to a keychain. The pull piece 515 is connected to the connecting hole 513 so as to be connected to the bolt. This facilitates the user to insert his finger into the pull piece 515 and pull out the bolt 510, which is more labor-saving and also facilitates the assembly of the locking assembly 50. Of course, in other implementations, the pull piece 515 may also be a rod-shaped structure, a hook-shaped structure, etc.

In an embodiment of the present application, the locking assembly 50 further includes a nut 53. The nut 53 is sleeved on the fastener 52 and threadedly connected with the fastener 52. The nut 53 can be rotated on fastener 52. By adjusting the position of the nut 53, the length of the fastener 52 extending into the second insertion hole 25 can be controlled, and then the length of the bolt 510 extending into the first insertion hole 44 can be controlled, thereby improving the stability of the connection between the fastener 52 and the first fixing seat 20.

In an embodiment of the present application, the number of the locking assembly 50 is one, but the number of the first insertion holes 44 is two, and the number of the second insertion holes 25 is also two. At this time, one may choose to install the locking assembly 50 to different sides of the first fixing seat 20 depending on the usage conditions. However, in other embodiments, there may be two locking assemblies 50, namely the locking assemblies 50 are disposed on both sides of the first fixing seat 20 to further improve the locking strength of the connecting arm 40.

In other implementations, the connecting arm 40 may be a whole body in one piece.

In other implementations, the fastener 52 may not be inserted into the second insertion hole 25 and threadedly fitted with the second insertion hole 25, but may be fixed to the outside of the first fixing seat 20. Furthermore, the fastener 52 does not need to be in the shape of a circular tube.

In other implementations, the bolt 510 and the pull piece 515 may be of an integral structure, and even the elastic expansion member 51 may be of an integral structure.

In an embodiment of the present application, the first fixing seat 20 and the second fixing seat 30 are fixed to two pieces respectively, and the drawbar 43 in the connecting arm 40 may be engaged with the catching portion 33 in the second fixing seat 30 so that the two pieces are connected together. Furthermore, the buckle 10 in the embodiment of the present application further has a locking assembly 50. When using the buckle 10, one only need to pull the elastic stretchable piece 51 in the locking assembly 50. After pulling the elastic stretchable piece 51, the elastic stretchable piece 51 is detached from the first insertion hole 44 in the connecting arm 40. At this time, the connecting arm 40 may be rotated to disengage the drawbar 43 from the catching portion 33. At this time, the two pieces connected by the buckle 10 are disconnected. To restore the connection between the two pieces, one only need to rotate the connecting arm 40 so that the drawbar 43 is engaged with the catching portion 33, and then release the elastic stretchable piece 51. At this time, the elastic stretchable piece 51 is reset and inserted into the first insertion hole 44, so that the buckle 10 enters the locked state. Since the buckle 10 requires few steps and little force during the entire use process, it is very simple and convenient to use. In addition, the entire buckle 10 has a simple structure and is easy to manufacture, which is conducive to reducing costs.

Figure 14:
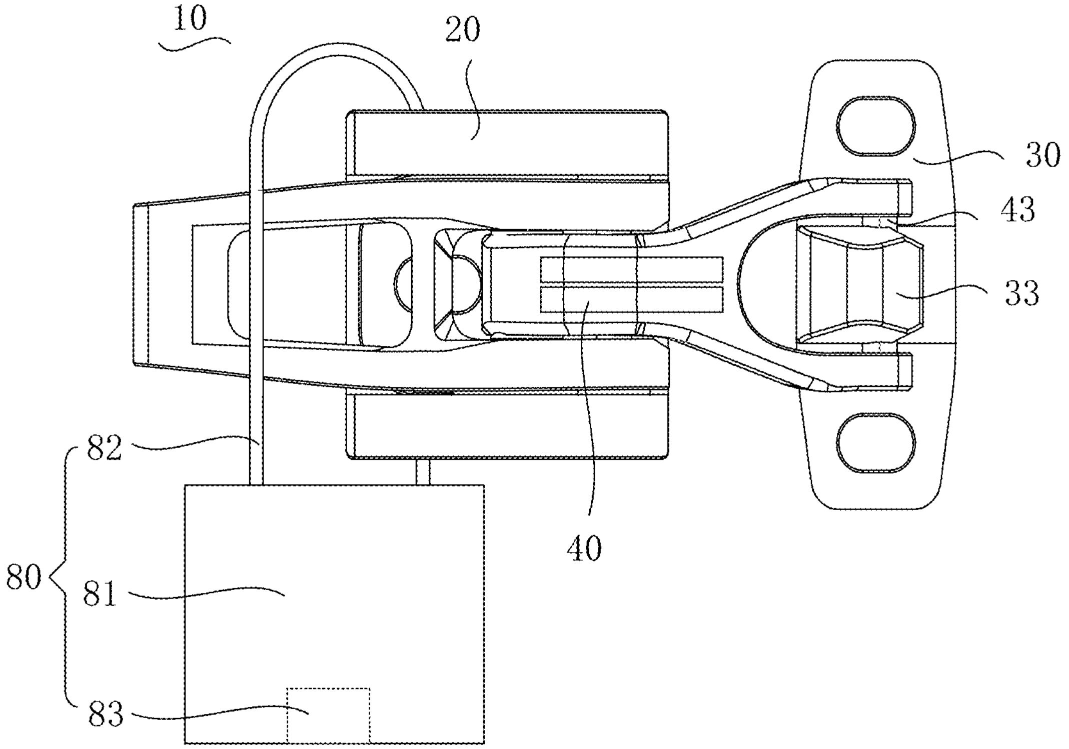
FIG. 14 is an overall schematic diagram of another locking assembly according to an embodiment of this application.

As illustrated in FIG. 14, embodiments of the present application further provide another locking assembly. The locking assembly 50 includes a padlock 80. At this time, both the first insertion hole 44 and the second insertion hole 25 are through holes. The padlock 80 passes through the first insertion hole 44 and the second insertion hole 25 to lock up the fixing arm 41.

In particular, the first plate 411 and the second plate 412 of the fixing arm 41 each include a first insertion hole 44. The first insertion holes 44 are all through holes. The diameters of the two first insertion holes 44 are the same or similar, and their central axes are located on a same straight line. Correspondingly, the first side plate 21 and the second side plate 22 in the first fixing seat 20 each include a second insertion hole 25, which is a through hole. The central axes of the two first insertion holes 44 and the two second insertion holes 25 are located on a same straight line, and the diameters of these holes are the same or similar.

The padlock 80 includes a lock body 81, a lock hook 82, and a lock cylinder 83. The lock body 81 is connected to an end of the lock hook 82. The lock body 81 is connected to the ends of the lock hook 82. The lock cylinder 83 is used to control one end of the lock hook 82 to be unlocked from the lock body 81. When it is needed to lock the connecting arm 40, one may pass end of the lock hook 82 through all the first insertion holes 44 and the second insertion holes 25, and then secure and lock it with the lock body 81. When the connecting arm 40 needs to be rotated, a key may be inserted into the lock cylinder 83, and one end of the lock hook 82 is separated from the lock body 81 so that the lock hook 82 can be removed from the connecting arm 40 and the first fixing seat 20. Here, a mechanical lock is taken as an example. If the padlock 80 is an electronic lock, it may be controlled through a password or remote control command.

In addition, the fixing arm 41 may also have only one first insertion hole 44, and the first fixing seat 20 may also have only one second insertion hole 25. Both the first insertion hole 44 and the second insertion hole 25 are through holes. At this time, it is also possible to use a small padlock 80 to lock only one side of the fixing arm 41 and the first fixing seat 20.

It should be noted that in the buckles according to the embodiments of the present application, the buckles are equipped with the above two designs of the locking assembly 50 at the same time, where the padlock 80 is used as a backup.

Of course, in some embodiments of the present application, the locking assembly 50 may also adopt other designs, such as spring-loaded locks, hooks, bolts, etc., and the design may be specifically selected depending on the actual situation.

Figure 15:
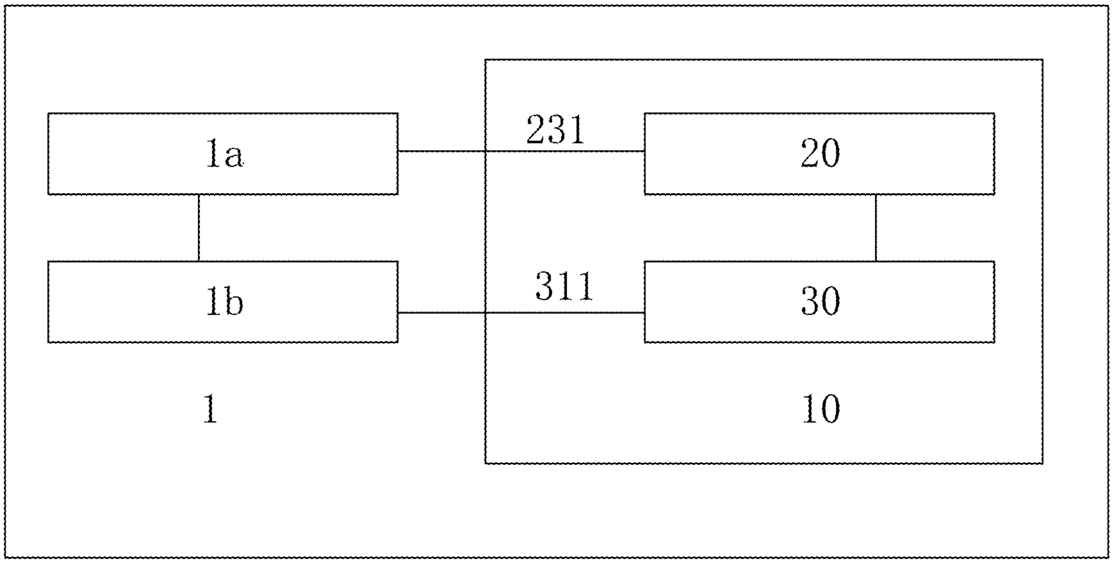
FIG. 15 is a schematic diagram of a roof tent according to an embodiment of this application.

As illustrated in FIG. 15, embodiments of the present application further provide a roof tent 1. The roof tent 1 includes a first board 1*a*, a second board 1*b*, and the buckle 10 as mentioned above. The first board 1*a* is the bottom of the roof tent 1 and is fixed to the top of the car. The second board 1*b* is the top of the roof tent 1 and can be opened and closed with respect to the first board 1*a*. One end of the first board 1*a* is rotatably connected to one end of the second board 1*b*. The first fixing seat 20 of the buckle 10 is fixed to the first board 1*a* through the first fixing portion 231. The second fixing seat 30 of the buckle 10 is fixed to the second board 1*b* through the second fixing portion 311. When the buckle 10 is in the locked state, the roof tent 1 cannot be opened or closed. When the buckle 10 is in the unlocked state, the roof tent 1 can be opened and closed.

The buckle 10 may be located on one side, two sides, or three sides of the roof tent 1, as long as it is not located at the end of the first board 1*a* and the second board 1*b* where they are rotatably connected. As a specific implementation, a plurality of buckles 10 are respectively provided on three sides of the roof tent 1.

Of course, in other embodiments, the first fixing seat 20 of the buckle 10 may be fixed to the second board 1*b* through the first fixing portion 231, and the second fixing seat 30 of the buckle 10 may be fixed to the first board 1*a* through the second fixing portion 311. Alternatively, in some of the buckles 10, the first fixing seat 20 may be fixed to the second board 1*b* through the first fixing portion 231, and the second fixing seat 30 may be fixed to the first board 1*a* through the second fixing portion 311, while in other buckles 10, the first fixing seat 20 of the buckle 10 may be fixed to the first board 1*a* through the first fixing portion 231, and the second fixing seat 30 of the buckle 10 may be fixed to the second board 1*b* through the second fixing portion 311.

Figure 16:
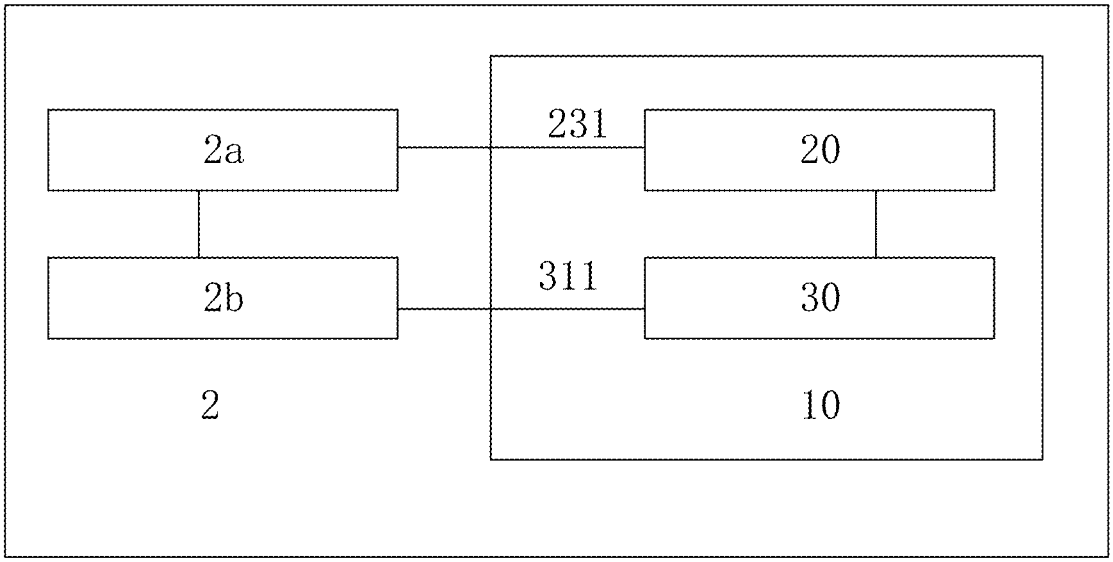
FIG. 16 is a schematic diagram of a roof trunk according to an embodiment of this application.

As illustrated in FIG. 16, embodiments of the present application further provide a roof trunk 2. The roof trunk 2 includes a first trunk part 2*a*, a second trunk part 2*b*, and the buckle 10 as mentioned above. The first trunk part 2*a* is the bottom of the roof trunk 2 and is fixed to the top of the car. The second trunk part 2*b* is the top of the roof trunk part 2 and is operative to be opened and closed with respect to the first trunk part 2*a*. One end of the first trunk part 2*a* is rotatably connected to one end of the second trunk part 2*b*. The first fixing seat 20 of the buckle 10 is fixed to the first trunk part 2*a* through the first fixing portion 231. The second fixing seat 30 of the buckle 10 is fixed to the second trunk part 2*b* through the second fixing portion 311. When the buckle 10 is in the locked state, the roof trunk 2 cannot be opened or closed. When the buckle 10 is in the unlocked state, the roof trunk part 2 can be opened and closed.

The buckle 10 may be disposed one side, two sides, or three sides of the roof trunk part 2, as long as it is not located at the end of the first trunk part 2*a* and the second trunk part 2*b* where they are rotatably connected. As a specific implementation, a plurality of buckles 10 are respectively disposed on three sides of the roof trunk 2.

Of course, in other embodiments, the first fixing seat 20 of the buckle 10 may be fixed to the second trunk part 2*b* through the first fixing portion 231, and the second fixing seat 30 of the buckle 10 may be fixed to the first trunk part 2*a* through the second fixing portion 311. Alternatively, in some of the buckles 10, the first fixing seat 20 may be fixed to the second trunk part 2*b* through the first fixing portion 231, and the second fixing seat 30 may be fixed to the first trunk part 2*a* through the second fixing portion 311, while in other buckles 10, the first fixing seat 20 of the buckle 10 may be fixed to the first trunk part 2*a* through the first fixing portion 231, and the second fixing seat 30 of the buckle 10 may be fixed to the second trunk part 2*b* through the second fixing portion 311.

It should be noted that the buckles 10 according to the embodiments of the present application may also be used in other structures or fields, such as doors, windows, boxes, etc., which will not be detailed here.

The foregoing description is merely a further detailed description of the present application with reference to some specific illustrative embodiments, but the specific implementations of the present application are not to be construed to be limited to these illustrative embodiments. For those having ordinary skill in the technical field to which this application pertains, numerous deductions or substitutions may be made without departing from the concept and spirit of this application, which shall all be regarded as falling in the scope of protection of this application.

What is claimed is:

1. A buckle, comprising:

a first fixing seat, comprising a first fixing portion;

a second fixing seat, arranged side by side with the first fixing seat, the second fixing seat comprising a catching portion and a second fixing portion;

a connecting arm, wherein one end of the connecting arm is rotatably connected to the first fixing seat, and another end of the connecting arm comprises a drawbar, the drawbar being used to be engaged and secured with the catching portion;

at least one locking assembly, wherein the connecting arm comprises at least one first insertion hole, the first fixing seat comprises a second insertion hole disposed corresponding to each of the at least one first insertion hole;

wherein the at least one locking assembly is used to be inserted into the first insertion hole and the second insertion hole to secure the connecting arm and the first fixing seat together to prevent the connecting arm from rotating;

wherein each of the at least one locking assembly comprises a fastener and an elastic stretchable piece, wherein the fastener is fixedly connected to the first fixing seat, and wherein the elastic stretchable piece is elastically connected to the fastener and is operative to be inserted into and fitted with the first insertion hole; wherein when being pulled the elastic stretchable piece is operative to contract so as to be separated from the first insertion hole, and the connecting arm is operative to be rotated so that the drawbar is operative to be separated from the catching portion, and so the buckle enters an unlocked state; wherein the connecting arm is operative to be rotated so that the drawbar is engaged and secured with the catching portion, and the elastic stretchable piece is operative to be inserted into and engaged with the first insertion hole, and so the buckle enters a locked state.

2. The buckle as recited in claim 1, wherein the second insertion hole is a circular threaded hole, and the fastener has a shape of a circular tube, wherein an outer surface of the fastener is formed with threads, and wherein the fastener is threadedly fitted with the second insertion hole;

wherein the elastic stretchable piece comprises a bolt, a spring, and a pull piece; wherein the bolt comprises a first bolt segment and a second bolt segment that are connected and located on a same straight line; wherein the first bolt segment has a greater cross-sectional area than that of the second bolt segment; wherein the spring is sleeved on the second bolt segment; and wherein an end of the second bolt segment facing away from the first bolt segment is connected to the pull piece;

wherein the fastener is hollow inside to define a first through hole and a second through hole that are oriented on a same straight line; wherein the first through hole is located between the second through hole and the first insertion hole; wherein the first through hole has a greater cross-sectional area than a cross-sectional area of the second through hole and than a cross-sectional area of the first bolt segment, wherein the second through hole has a smaller cross-sectional area than a cross-sectional area of the first bolt segment and greater than that of the second bolt segment; wherein the second bolt segment is operative to be fitted with the second through hole, and wherein the first bolt segment is operative to be fitted with the first through hole.

3. The buckle as recited in claim 2, wherein the at least one locking assembly further comprises a nut that is sleeved on the fastener and threadedly connected to the fastener.

4. The buckle as recited in claim 2, wherein one end of the second bolt segment facing away from the first bolt segment comprises a connecting hole; wherein the pull piece is ring-shaped and passes through the connecting hole to be connected to the bolt.

5. The buckle as recited in claim 2, wherein the connecting arm comprises a slide groove; wherein along a length direction of the slide groove, a first end of the slide groove is connected to the first insertion hole, and a second end of the slide groove penetrates through the connecting arm; wherein a depth of the slide groove gradually increases along a direction from the first end of the slide groove to the second end of the slide groove;

wherein the length direction of the slide groove is a tangential direction of a rotation path of the connecting arm around the fixing seat, and wherein the depth direction of the slide groove is perpendicular to the length direction of the slide groove.

6. The buckle as recited in claim 1, wherein the connecting arm comprises a fixing arm and a movable arm; wherein one end of the fixing arm is rotatably connected to the first fixing seat, one end of the movable arm is rotatably connected to the fixing arm, and wherein the drawbar is disposed at an end of the movable arm facing away from the fixing arm;

wherein the fixing arm is operative to rotate in a direction away from or towards the first fixing seat, and wherein the movable arm is operative to rotate in a direction away from or towards the first fixing seat.

7. The buckle as recited in claim 6, wherein the fixing arm comprises a first plate and a second plate that are oppositely arranged, and further comprises a handle and a cross beam that are connecting the first plate and the second plate together; wherein the handle connects an end of the first plate with an end of the second plate, and the cross beam connects a middle portion of the first plate with a middle portion of the second plate;

wherein the first insertion hole is defined in each of the first plate and the second plate; wherein the first plate and the second plate each comprise a first shaft hole; wherein the first shaft hole is disposed at an end of each of the first plate and the second plate facing away from the handle, and the fixing arm is rotatably connected to the first fixing seat through a first rotary shaft; wherein the first rotary shaft passes through the first shaft holes in the first plate and the second plate to be connected to the first fixing seat.

8. The buckle as recited in claim 7, wherein the movable arm comprises a second shaft hole, wherein the movable arm is rotatably connected to the fixing arm through the second rotary shaft, wherein the second rotary shaft passes through the second shaft hole to be connected to the first plate and the second plate.

9. The buckle as recited in claim 8, wherein the second rotary shaft is disposed between the cross beam and the first rotary shaft, and wherein the second rotary shaft is oriented parallel to the first rotary shaft.

10. The buckle as recited in claim 7, wherein an opening is defined at one end of the movable arm facing away from the fixing arm, and wherein a connecting rod oriented parallel to the first rotary shaft is disposed at an open end of the opening; wherein the connecting rod constitutes the drawbar;

wherein the second fixing seat comprises a first bottom plate and a protrusion, wherein the protrusion and the second fixing portion are both disposed on the first bottom plate; wherein a side of the protrusion facing away from the first fixing seat defines a catching notch; wherein when the buckle is in the locked state, the drawbar is engaged and interlocked with the catching notch, and wherein the protrusion and the catching notch jointly constitute the catching portion.

11. The buckle as recited in claim 10, wherein the second fixing portion comprises two racetrack-shaped through slots, which are respectively located on both sides of the protrusion.

12. The buckle as recited in claim 7, wherein the first fixing seat comprises a first side plate, a second side plate, a second bottom plate, and a stage;

wherein the first side plate, the second side plate, and the stage are all arranged on a same side of the second bottom plate; wherein the first side plate and the second side plate are arranged oppositely, wherein two ends of the stage are respectively connected to one end of the first side plate and one end of the second side plate; wherein the stage has a height that is lower than a height of each of the first side plate and the second side plate;

wherein the first fixing portion is disposed on the second bottom plate; wherein both ends of the first rotary shaft are connected to the first side plate and the second side plate respectively; wherein when the lock is in a locked state, the fixing arm abuts against the stage.

13. The buckle as recited in claim 12, wherein the second insertion hole is defined in each of the first side plate and the second side plate.

14. The buckle as recited in claim 13, wherein the buckle comprises two locking assemblies, wherein one of the two locking assemblies is fitted with the first insertion hole in the first plate and the second insertion hole in the first side plate, and wherein the other one of the two locking assemblies is fitted with the first insertion hole in the second plate and the second insertion hole in the second side plate.

15. The buckle as recited in claim 12, wherein the first fixing portion comprises two racetrack-shaped through slots, which are disposed side by side in a central area of the second bottom plate.

16. The buckle as recited in claim 6, wherein the fixing arm comprises a first plate and a second plate that are oppositely arranged, and further comprises a handle and a cross beam connecting the first plate and the second plate together; wherein the handle connects an end of the first plate with an end of the second plate, and the cross beam connects a middle portion of the first plate with a middle portion the second plate;

wherein the first insertion hole is defined in the first plate or the second plate, wherein the first plate and the second plate each define a first shaft hole located at an end of the respective first plate or second plate facing away from the handle; wherein the fixing arm is rotatably connected to the first fixing seat through a first rotary shaft; wherein the first rotary shaft passes through the first shaft holes in the first plate and the second plate to be connected to the first fixing seat;

wherein the first fixing seat comprises a first side plate, a second side plate, a second bottom plate, and a stage; wherein the first side plate, the second side plate, and the stage are all arranged on a same side of the second bottom plate; wherein the first side plate and the second side plate are arranged oppositely; wherein two ends of the stage are respectively connected to one end of the first side plate and one end of the second side plate, wherein the stage has a height that is lower than a height of each of the first side plate and the second side plate;

wherein the first fixing portion is disposed on the second bottom plate, and wherein when the buckle is in a locked state, the fixing arm abuts against the stage;

wherein the second insertion hole is defined the first side plate or the second side plate, and wherein two ends of the first rotary shaft are connected to the first side plate and the second side plate respectively;

wherein the buckle comprises one locking assembly, which is fitted with the first insertion hole and the second insertion hole.

17. The buckle as recited in claim 1, wherein the at least one locking assembly comprises a padlock, wherein the first insertion hole and the second insertion hole are both through holes, wherein the padlock passes through the first insertion hole and the second insertion hole for locking the connecting arm.

18. A roof tent, comprising a first board, a second board, and at least one buckle; wherein one end of the first board is rotatably connected with one end of the second board; wherein the buckle comprises:

a first fixing seat, comprising a first fixing portion, wherein the first fixing seat is secured to the first board through the first fixing portion;

a second fixing seat, arranged side by side with the first fixing seat and comprising a catching portion and a second fixing portion, wherein the second fixing seat is fixed to the second board through the second fixing portion;

a connecting arm, wherein one end of the connecting arm is rotatably connected to the first fixing seat, and wherein another end of the connecting arm comprises a drawbar, the drawbar being used to be engaged and secured with the catching portion;

at least one locking assembly, wherein the connecting arm comprises at least one first insertion hole, the first fixing seat comprises a second insertion hole corresponding to each of the at least one first insertion hole; wherein the at least one locking assembly is used to be inserted into the first insertion hole and the second insertion hole to secure the connecting arm and the first fixing seat together to prevent the connecting arm from rotating;

wherein each of the at least one locking assembly comprises a fastener and an elastic stretchable piece, wherein the fastener is fixedly connected to the first fixing seat, and wherein the elastic stretchable piece is elastically connected to the fastener and is operative to be inserted into and fitted with the first insertion hole; wherein when being pulled the elastic stretchable piece is operative to contract so as to be separated from the first insertion hole, and the connecting arm is operative to be rotated so that the drawbar is operative to be separated from the catching portion, and so the buckle enters an unlocked state; wherein the connecting arm is operative to be rotated so that the drawbar is engaged and secured with the catching portion, and the elastic stretchable piece is operative to be inserted into and engaged with the first insertion hole, and so the buckle enters a locked state.

19. A roof trunk, comprising a first trunk part, a second trunk part, and at least one buckle; wherein one end of the first trunk part is rotatably connected with one end of the second trunk part; wherein the buckle comprises:

a first fixing seat, comprising a first fixing portion, wherein the first fixing seat is secured to the first trunk part through the first fixing portion;

a second fixing seat, arranged side by side with the first fixing seat and comprising a catching portion and a second fixing portion, wherein the second fixing seat is fixed to the second trunk part through the second fixing portion;

a connecting arm, wherein one end of the connecting arm is rotatably connected to the first fixing seat, and wherein another end of the connecting arm comprises a drawbar, the drawbar being used to be engaged and secured with the catching portion;

at least one locking assembly, wherein the connecting arm comprises at least one first insertion hole, the first fixing seat comprises a second insertion hole corresponding to each of the at least one first insertion hole; wherein the at least one locking assembly is used to be inserted into the first insertion hole and the second insertion hole to secure the connecting arm and the first fixing seat together to prevent the connecting arm from rotating;

wherein each of the at least one locking assembly comprises a fastener and an elastic stretchable piece, wherein the fastener is fixedly connected to the first fixing seat, and wherein the elastic stretchable piece is elastically connected to the fastener and is operative to be inserted into and fitted with the first insertion hole; wherein when being pulled the elastic stretchable piece is operative to contract so as to be separated from the first insertion hole, and the connecting arm is operative to be rotated so that the drawbar is operative to be separated from the catching portion, and so the buckle enters an unlocked state; wherein the connecting arm is operative to be rotated so that the drawbar is engaged and secured with the catching portion, and the elastic stretchable piece is operative to be inserted into and engaged with the first insertion hole, and so the buckle enters a locked state.

* * * * *